United States Patent
Tanaka et al.

(10) Patent No.: US 12,380,598 B2
(45) Date of Patent: Aug. 5, 2025

(54) MAP INFORMATION UPDATE METHOD, LANDMARK GENERATION METHOD, AND FEATURE POINT DISTRIBUTION ADJUSTMENT METHOD

(71) Applicant: Socionext Inc., Kanagawa (JP)

(72) Inventors: Tetsuya Tanaka, Yokohama (JP); Yukihiro Sasagawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 453 days.

(21) Appl. No.: 17/975,168

(22) Filed: Oct. 27, 2022

(65) Prior Publication Data

US 2023/0046001 A1 Feb. 16, 2023

Related U.S. Application Data

(63) Continuation of application No. PCT/JP2021/018878, filed on May 18, 2021.
(Continued)

(51) Int. Cl.
*G06T 7/00* (2017.01)
*G01C 21/00* (2006.01)
*G06T 7/73* (2017.01)

(52) U.S. Cl.
CPC ............ *G06T 7/74* (2017.01); *G01C 21/3811* (2020.08); *G06T 2207/20076* (2013.01);
(Continued)

(58) Field of Classification Search
CPC ............ G06T 7/74; G06T 2207/20076; G06T 2207/20081; G06T 2207/20084; G06T 2207/30244; G01C 21/3811
See application file for complete search history.

(56) References Cited

U.S. PATENT DOCUMENTS

2012/0121161 A1  5/2012  Eade et al.
2014/0003705 A1*  1/2014  Taguchi .................. G06T 7/344
                                                     382/154
(Continued)

FOREIGN PATENT DOCUMENTS

JP  2007-048068 A  2/2007
JP  2013-537995 A  10/2013
(Continued)

OTHER PUBLICATIONS

International Search Report (ISR) issued on Aug. 10, 2021 in International (PCT) Application No. PCT/JP2021/018878, with English translation.
(Continued)

*Primary Examiner* — Van D Huynh
(74) *Attorney, Agent, or Firm* — Rimon P.C.

(57) ABSTRACT

A map information update method includes: (a) obtaining map information; (b) obtaining landmark observed positions indicating positions of one or more landmarks in a captured image; (c) adding that includes (i) generating added map information by adding information pertaining to the landmark observed positions to the map information, and (ii) updating the map information obtained in (a) to the added map information; (d) predicting that includes (i) calculating predicted map information based on the map information updated in (c), by using a neural network inference engine that has been trained, and (ii) updating the map information to the predicted map information; and updating information that includes (i) calculating updated map information based on the map information updated in (d), by using a gradient method, and (ii) updating the map information to the updated map information.

12 Claims, 12 Drawing Sheets

Related U.S. Application Data

(60) Provisional application No. 63/060,932, filed on Aug. 4, 2020, provisional application No. 63/028,309, filed on May 21, 2020.

(52) U.S. Cl.
CPC ............ *G06T 2207/20081* (2013.01); *G06T 2207/20084* (2013.01); *G06T 2207/30244* (2013.01)

(56) References Cited

U.S. PATENT DOCUMENTS

| | | | | |
|---|---|---|---|---|
| 2017/0019653 | A1* | 1/2017 | Chen | G06T 7/593 |
| 2018/0172454 | A1* | 6/2018 | Ghadiok | G01C 21/005 |
| 2019/0212752 | A1* | 7/2019 | Fong | G05D 1/6987 |
| 2019/0268599 | A1* | 8/2019 | Hannuksela | G03B 37/00 |
| 2019/0318179 | A1* | 10/2019 | Jiang | G06V 20/586 |
| 2020/0064844 | A1* | 2/2020 | Shashua | G06V 20/63 |
| 2020/0098135 | A1* | 3/2020 | Ganjineh | G01C 21/3811 |
| 2020/0143603 | A1* | 5/2020 | Kotake | G01B 11/002 |
| 2020/0249032 | A1* | 8/2020 | Lee | G09B 29/006 |
| 2021/0129832 | A1* | 5/2021 | Sakano | B60W 60/005 |
| 2021/0199463 | A1* | 7/2021 | Kitahara | G01C 21/3815 |
| 2021/0375054 | A1* | 12/2021 | Pan | G06T 19/006 |

FOREIGN PATENT DOCUMENTS

| | | |
|---|---|---|
| JP | 2015-515655 A | 5/2015 |
| JP | 2017-503290 A | 1/2017 |
| JP | 2019-121365 A | 7/2019 |

OTHER PUBLICATIONS

Yuuki Iwamoto, Yasuyuki Sugaya, and Kenichi Kanatani,"Bundle Adjustment for 3-D Reconstruction: Implementation and Evaluation," IPSJ SIG Technical Report, vol. 2011-CVIM-175 No. 19, pp. 1-8, Jan. 20, 2011.

Takayuki Okatani, "Bundle Adjustment," IPSJ SIG Technical Report, vol. 2009-CVIM-167 No. 37, pp. 1-16, Jun. 10, 2009.

Ryosuke Ichikari et al., "Rehearsal Path Method: A Marker-less Camera Tracking Method Aiming for Robustness to the Real World," TVRSJ vol. 17 No. 3, pp. 241-252, Sep. 30, 2012, Cited in the ISR for PCT/JP2021/018878.

* cited by examiner

MAP INFORMATION UPDATE METHOD, LANDMARK GENERATION METHOD, AND FEATURE POINT DISTRIBUTION ADJUSTMENT METHOD

CROSS REFERENCE TO RELATED APPLICATIONS

This is a continuation application of PCT International Application No. PCT/JP2021/018878 filed on May 18, 2021, designating the United States of America, which is based on and claims priority of U.S. Provisional Patent Application No. 63/028,309 filed on May 21, 2020 and U.S. Provisional Patent Application No. 63/060,932 filed on Aug. 4, 2020. The entire disclosures of the above-identified applications, including the specifications, drawings and claims are incorporated herein by reference in their entirety.

FIELD

The present disclosure relates to a map information update method, a landmark generation method, and a feature point distribution adjustment method.

BACKGROUND

Visual simultaneous localization and mapping (VSLAM) technology that captures images using a camera and simultaneously estimates a position of the camera and positions of surrounding landmarks from information included in the captured images has been known.

VSLAM technology includes the following core processes: (i) seeking of a reprojection error that is an error between a position of a captured landmark within a captured image, and a reprojection position that is a position within the captured image calculated from an assumed camera orientation (i.e., the position and orientation of a camera) and an assumed position of the landmark, and (ii) seeking of a camera orientation and a position of the landmark which can reduce the reprojection error to zero (in reality, a sufficiently reduced error). Information including a combination of a camera orientation and a position of a landmark is called map information.

Search for map information that can reduce a reprojection error to zero is called bundle adjustment, and is commonly categorized as an optimization problem of a nonlinear least-squares method. For this reason, in the bundle adjustment, a process of slightly correcting map information such that a reprojection error is reduced, and a process of iterating the correction until reprojection error values converge need to be performed (for example, see Patent Literature (PTL) 1, Non Patent Literature (NPL) 1, and NPL 2).

CITATION LIST

Patent Literature

PTL 1: Japanese Unexamined Patent Application Publication (Translation of PCT Application) No. 2017-503290

Non Patent Literature

NPL 1: Iwamoto, Y., Sugaya, Y., Kanatani, K. (2011). Bundle Adjustment for 3-D Reconstruction: Implementation and Evaluation. *Journal of Information Processing*, 2011-CVIM-175-19, 1-8.

NPL 2: Okatani, T. (2009). Bundle Adjustment. *Journal of Information Processing*, 2009-CVIM167-37, 1-16.

SUMMARY

Technical Problem

In VSLAM technology, a new reprojection error is calculated each time a new captured image (i.e., a key frame) is added, and map information is updated after bundle adjustment is performed. The above-described processes are essential for maintaining the accuracy of map information.

As an algorithm for convergence required during bundle adjustment, an algorithm that employs a gradient method is typically used. As an algorithm that employs the gradient method, an algorithm in which a steepest-descent method and the Gauss-Newton algorithm are combined has been known, for example. In this algorithm, corrections are made using the steepest-descent method until a reprojection error approaches the minimum value, and after the reprojection error has approached the minimum value, corrections are made using the Gauss-Newton algorithm. For such an algorithm, the following processing requiring large amounts of computations needs to be performed each time a correction is repeated: generation of approximate Hessian matrices, and calculation of an amount of corrections to be made as a result of solving simultaneous equations. VSLAM technology including such processing requiring large amounts of computations poses a problem when VSLAM technology is used.

In view of this, the present disclosure addresses the above-described problems, and aims to provide a map information update method and the like that can reduce an amount of computations.

Solution to Problem

In order to provide such a method as described above, a map information update method according to one embodiment of the present disclosure includes: (a) obtaining map information including estimated positions of a camera and one or more landmarks in a first coordinate system; (b) obtaining landmark observed positions in a second coordinate system in a captured image captured by the camera, the landmark observed positions indicating positions of the one or more landmarks; (c) adding that includes (i) generating added map information by adding information pertaining to the landmark observed positions to the map information obtained in (a), and (ii) updating the map information obtained in (a) to the added map information; (d) predicting that includes (i) calculating predicted map information based on the map information updated in (c), by using a neural network inference engine that has been trained, and (ii) updating the map information updated in (c) to the predicted map information; and (e) updating information that includes (i) calculating updated map information based on the map information updated in (d), by using a gradient method, and (ii) updating the map information updated in (d) to the updated map information.

In order to provide such a method as described above, a map information update method according to one embodiment of the present disclosure includes: (a) obtaining map information including estimated positions of a camera and one or more landmarks in a first coordinate system; (b) obtaining landmark observed positions in a second coordinate system in a captured image captured by the camera, the landmark observed positions indicating positions of the one or more landmarks; (c) adding that includes (i) generating added map information by adding information pertaining to the landmark observed positions to the map information obtained in (a), and (ii) updating the map information obtained in (a) to the added map information; and (d) updating that includes: (d-1) inferring including (i) calculating inferred map information based on the map information updated in (c), by using a neural network inference engine for updates that has been trained, and (ii) updating the map information updated in (c) to the inferred map information; and (d-2) updating including (i) calculating updated map information based on the map information updated in (d-1), by using a gradient method, and (ii) updating the map information updated in (d-1) to the updated map information.

In order to provide such a method as described above, a map information update method according to one embodiment of the present disclosure includes: (a) obtaining map information including estimated positions of a camera and one or more landmarks in a first coordinate system; (b) obtaining landmark observed positions in a second coordinate system in a captured image captured by the camera, the landmark observed positions indicating positions of the one or more landmarks; (c) adding that includes (i) generating added map information by adding information pertaining to the landmark observed positions to the map information obtained in (a), and (ii) updating the map information obtained in (a) to the added map information; (d) estimating an amount of change in a reprojection error due to bundle adjustment performed on the map information updated in (c); (e) updating information that includes (i) calculating updated map information based on the map information updated in (c), by using a gradient method, and (ii) updating the map information updated in (c) to the updated map information; and (f) determining an upper limit of a total number of iterations to be performed in (e), based on the amount of change estimated in (d). The reprojection error is calculated using a reprojection error function that calculates an error between the landmark observed positions and reprojection positions in the captured image, the reprojection positions corresponding to the landmark observed positions and being calculated based on the map information.

In order to provide such a method as described above, a landmark generation method according to one embodiment of the present disclosure is a landmark generation method for generating a landmark by performing triangulation based on a first captured image and a second captured image captured by a camera. The landmark generation method includes: extracting a first feature point included in the first captured image and a second feature point included in the second captured image, the second feature point being a matching target to be matched with the first feature point; extracting a third feature point included in the first captured image and a fourth feature point included in the second captured image, the third feature point being at a short distance from the first feature point, the fourth feature point being a matching target to be matched with the third feature point; predicting a probability of a matching error in matching the first feature point with the second feature point, based on information on the first feature point, the second feature point, the third feature point, and the fourth feature point; and deciding, based on the probability of the matching error, whether to generate a landmark based on the first feature point and the second feature point.

In order to provide such a method as described above, a feature point distribution adjustment method according to one embodiment of the present disclosure is a feature point distribution adjustment method for adjusting a distribution of feature points corresponding to one or more landmarks included in a captured image captured by a camera. The feature point distribution adjustment method includes: extracting a plurality of first feature points corresponding to the one or more landmarks included in the captured image; extracting, from among the plurality of first feature points, a feature point group including a plurality of second feature points; and based on a distribution of the plurality of second feature points in the captured image, adjusting feature points by performing at least one of (i) deleting one or more second feature points included in the feature point group, or (ii) adding a third feature point based on the plurality of second feature points.

Advantageous Effects

The present disclosure can provide a map information update method and the like that can reduce an amount of computations.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
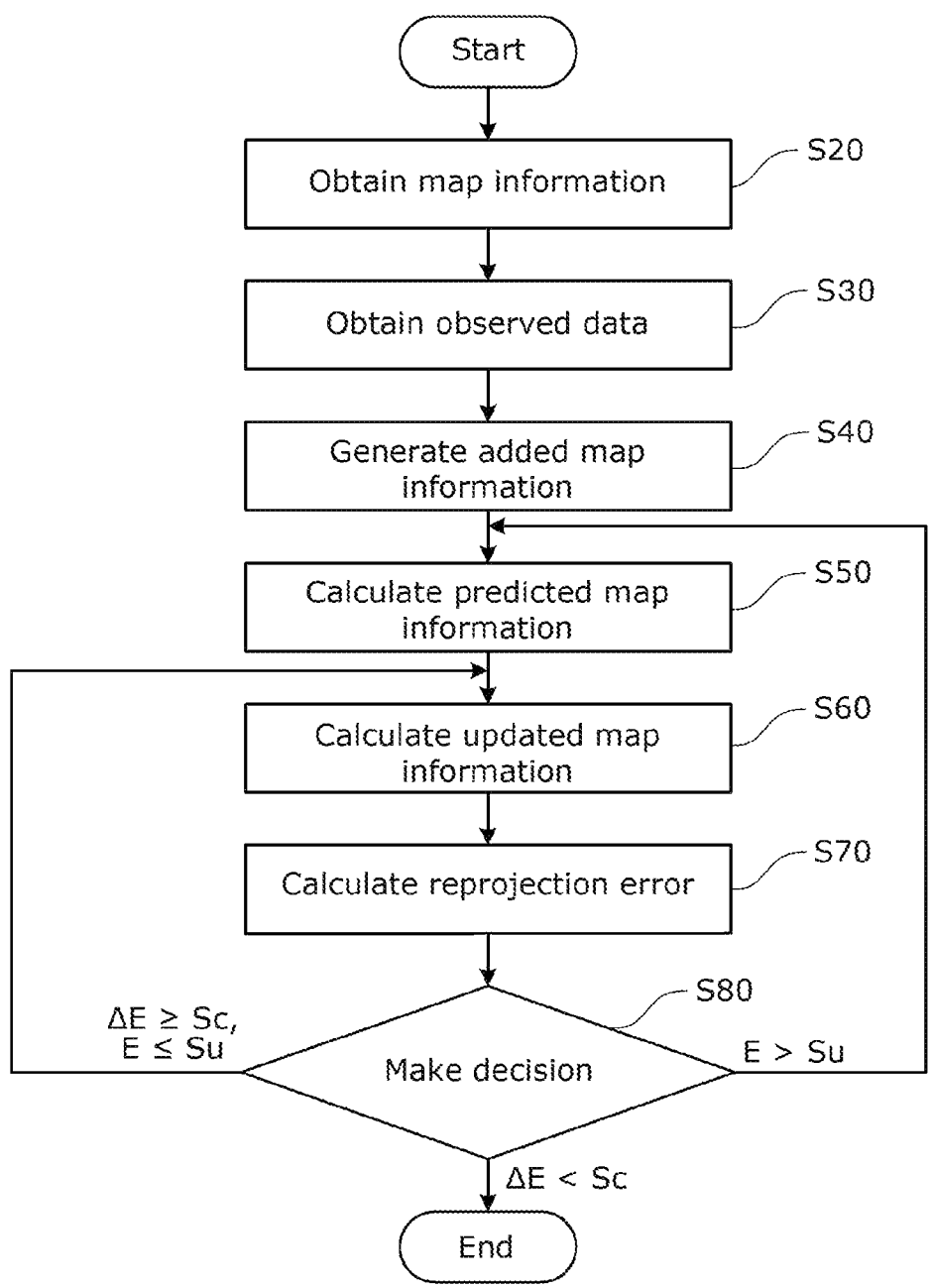
FIG. 1 is a flowchart of a map information update method according to Embodiment 1.

Hereinafter, embodiments according to the present disclosure will be described in detail with reference to the drawings. Note that the embodiments described below each show a specific example of the present disclosure. The numerical values, shapes, materials, standards, structural elements, the arrangement and connection of the structural elements, steps, and the orders of the steps, and the like presented in the embodiments below are mere examples, and are not intended to limit the present disclosure. In addition, among the structural elements in the embodiments below, those not recited in any one of the independent claims defining the broadest concept of the present disclosure are described as optional structural elements. Moreover, the drawings do not necessarily provide strictly accurate illustrations. Throughout the drawings, the same reference numeral is given to substantially the same structural element, and redundant description may be omitted or simplified.

Embodiment 1

A map information update method according to Embodiment 1 will be described. The map information update method according to the embodiment is a method employed in VSLAM technology that captures images using a camera, and simultaneously estimates a position of the camera and positions of surrounding landmarks from information included in the captured images.

Firstly, in VSLAM technology, one three-dimensional coordinate system is conceived as a first coordinate system, and a camera is provided in the first coordinate system. The first coordinate system is a fixed coordinate system for a space in which the camera, etc. are provided. The first coordinate system is also called a world coordinate system. A landmark is generated from captured images captured by the camera. Here, a landmark is a three-dimensional point generated in the first coordinate system. For example, a landmark is generated by performing triangulation based on corresponding feature points included in two captured images. In the map information update method according to the embodiment, map information including estimated positions of the camera and one or more landmarks in the first coordinate system is updated. Specifically, the map information according to the embodiment is updated when information on a captured image captured by a camera is added to the map information.

Hereinafter, the map information update method according to the embodiment will be described with reference to FIG. 1. FIG. 1 is a flowchart of the map information update method according to the embodiment.

Firstly, as illustrated in FIG. 1, map information is obtained (S20) in the map information update method according to the embodiment. The map information includes at least estimated positions of a camera and one or more landmarks in a first coordinate system. Note that the map information may include information other than estimated positions of the camera and the one or more landmarks in the first coordinate system. For example, the map information may include information on an orientation of the camera in the first coordinate system.

Next, landmark observed positions indicating positions of the one or more landmarks in a second coordinate system in a captured image captured by the camera are obtained (S30). The second coordinate system is a fixed coordinate system for captured images. The second coordinate system is also called a key frame coordinate system. The landmark observed positions are positions of feature points corresponding to the positions of the one or more landmarks in the second coordinate system.

Next, added map information is generated by adding information pertaining to the landmark observed positions to the map information obtained in step S20, and the map information is updated to the added map information (S40). The information pertaining to the landmark observed positions is, for example, estimated positions of landmarks generated based on feature points included in a captured image. The information pertaining to landmark observed positions may be information roughly estimated from, for example, the position of a camera.

After step S40, predicted map information is calculated based on the map information updated in step S40, by using a trained neural network inference engine, and the map information updated in step S40 is updated to the predicted map information (S50). Here, a method for calculating the predicted map information will be described. In updating map information, bundle adjustment is typically performed. In other words, map information that can reduce a reprojection error to zero is searched. In this embodiment, a reprojection error is calculated using a reprojection error function that is a function used for calculating an error between a landmark observed position and a reprojection position in a captured image.

The reprojection position corresponds to the landmark observed position, and is calculated based on map information. Note that a reprojection error may include the total sum of one of or both of: (i) errors calculated for a plurality of landmarks included in the map information by using the reprojection error, and (ii) errors calculated for a plurality of captured images by using the reprojection error function.

Figure 2:
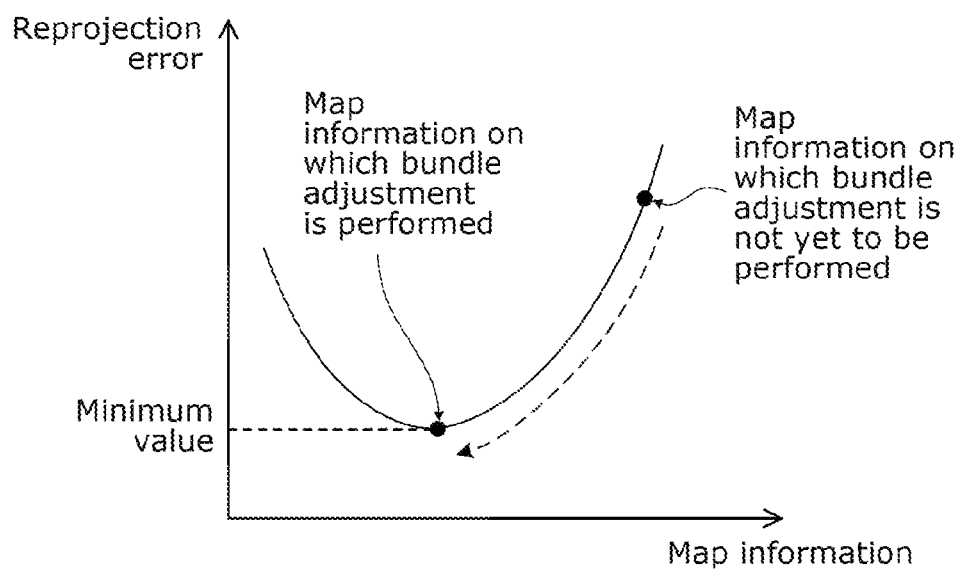
FIG. 2 is a schematic graph illustrating a relationship between map information and a reprojection error in bundle adjustment.

Here, an overview of bundle adjustment will be described with reference to FIG. 2. FIG. 2 is a schematic graph illustrating a relationship between map information and a reprojection error in bundle adjustment. The horizontal axis in FIG. 2 represents an amount schematically representing map information as one variable, and the vertical axis in FIG. 2 represents a reprojection error with respect to the map information.

As illustrated in FIG. 2, bundle adjustment corrects map information on which bundle adjustment is not yet to be performed to map information that minimizes a reprojection error. For example, when bundle adjustment is performed using an algorithm that uses a gradient method such as an algorithm in which a steepest-descent method and the Gauss-Newton algorithm are combined, a small amount of corrections is made on map information on which bundle adjustment is not yet to be performed, and calculation of a reprojection error in corrected map information is repeatedly performed to search for map information that minimizes a reprojection error. Note that map information that minimizes a reprojection error is hereinafter also called a solution to map information. An algorithm that uses the gradient method includes the following processing requiring large amounts of computations which needs to be performed each time a correction is repeated: generation of approximate Hessian matrices, and calculation of an amount of corrections to be made as a result of solving simultaneous equations that utilize a nonlinear least-squares method.

Particularly, when an error between map information on which bundle adjustment is not yet to be performed and a solution to map information is great, numerous iterative computations need to be performed.

Figure 3:
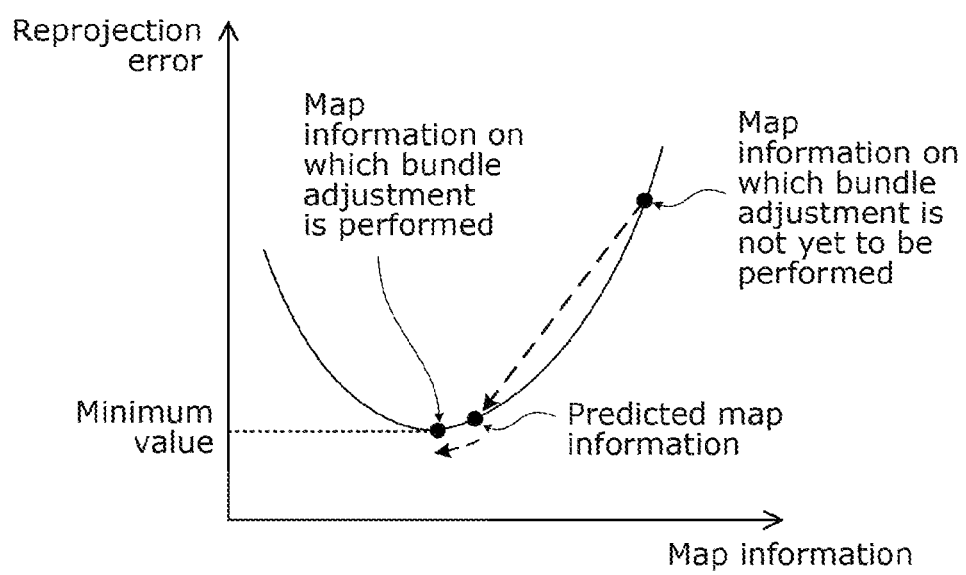
FIG. 3 is a schematic graph illustrating an overview of predicted map information according to Embodiment 1.

In view of such conventional techniques, this embodiment reduces an amount of computations by calculating predicted map information using a neural network inference engine. An overview of a method for calculating predicted map information according to the embodiment will be described with reference to FIG. 3. FIG. 3 is a schematic graph illustrating an overview of predicted map information according to the embodiment.

As illustrated in FIG. 3, map information that has brought a reprojection error closer to the minimum value is calculated, as predicted map information, based on map information by using a neural network inference engine in this embodiment. With this, map information that has brought a reprojection error closer to the minimum value can be obtained without repetitively performing computations using an algorithm that uses the gradient method. The neural network inference engine as described above is a trained neural network inference engine that has used map information for learning as an input, and has learned using updated map information for learning as training data. The map information for learning is not particularly limited as long as the map information for learning is the same information as added map information used in the map information update method according to the embodiment.

The updated map information for learning is map information that is generated based on map information for learning, and reduces a reprojection error calculated using the reprojection error function. Here, the reprojection error function is a function used for calculating an error between a landmark observed position and a reprojection position in a captured image. The reprojection position corresponds to the landmark observed position, and is calculated based on map information. Specifically, known functions disclosed in, for example, NPL 1 may be used as the reprojection error function.

The updated map information for learning is obtained by actually performing, using the gradient method, bundle adjustment on a landmark observed position for learning and map information for learning, for example. Note that map information that reduces a reprojection error may be map information that minimizes a reprojection error. The map information that minimizes a reprojection error is not limited to map information that strictly minimizes a reprojection error, and includes map information that substantially minimizes a reprojection error. For example, map information that minimizes a reprojection error also includes map information that causes a difference between a reprojection error with respect to map information and the minimum value of a reprojection error to be less than or equal to 5% of the minimum value.

The neural network inference engine according to the embodiment is trained as described above to learn a shape of an error function which indicates a relationship between map information and a reprojection error. Learning performed by the neural network inference engine is a process corresponding to error function fitting. Learning of a shape of the error function allows the neural network inference engine to predict map information that minimizes a reprojection error. Note that although information such as a position of a camera which is included in map information changes according to map information, an error function learned by the neural network inference engine does not change. Moreover, the predicted map information need not be map information that minimizes a reprojection error.

Note that the following step may be added: a step for preventing predicted map information that is calculated by using the neural network inference engine from being far from reaching a solution to map information (i.e., a difference between the predicted map information and the solution to map information is greater than a difference between added map information and the solution to map information). For example, the neural network inference engine that predicts, for added map information, a correction direction for approaching the solution to map information may be prepared in advance, and whether predicted map information predicted by the neural network inference engine is closer to the solution to map information than the added map information is closer to the solution to map information may be decided.

In this embodiment, at least some of computations performed in conventional techniques, such as a solution calculation of simultaneous equations using the gradient method, can be replaced by an inference drawn by the neural network inference engine. For this reason, this embodiment can reduce an amount of calculations and can increase a degree of parallelism of computations, as compared with the gradient method. Therefore, the embodiment can produce advantageous effects such as an increase in the speed of updating map information and a reduction in electric power consumption. Furthermore, drawing an inference by using the neural network inference engine can reduce computation accuracy. For this reason, it is also possible to simplify a configuration of hardware such as a computer for executing the map information update method.

Next, as illustrated in FIG. 1, updated map information is calculated based on the map information updated in step S50, by using the gradient method, and the map information updated in step S50 is updated to the updated map information (S60). In other words, the map information is updated using, in the same manner as conventional techniques, an algorithm in which the steepest-descent method and the Gauss-Newton algorithm are combined so that the map information approaches a solution to map information, for example.

Next, a reprojection error with respect to the map information is calculated (S70). Specifically, a reprojection error with respect to the map information is calculated using the above-described reprojection error function.

Next, convergence of updates on the map information updated in step S60 is decided based on the reprojection error calculated using the reprojection error function for the map information updated in step S60, and based on a result of the decision, whether to revert to the prediction step or the updating step, or to terminate an update on the map information updated in step S60 is determined (S80). For example, when amount of change $\Delta E$ of a reprojection error from a previous decision (for the first-time decision, an amount of change from a reprojection error with respect to the predicted map information) is less than predetermined convergence threshold Sc ($\Delta E < Sc$ in step S80), it is determined that a solution to map information is achieved, and an update on the map information is terminated. Moreover, when reprojection error E is greater than upper limit Su ($E > Su$ in S80), it is determined that the prediction map is inappropriate. Accordingly, the processing reverts to step S50, and predicted map information is recalculated. In addition, when amount of change $\Delta E$ of a reprojection error from a previous decision is greater than or equal to convergence threshold Sc, and reprojection error E is less than or equal to upper limit Su ($\Delta E \geq Sc$ and $E \leq Su$ in S80), the processing reverts to step S60 and map information is updated again by using the gradient method.

The map information update method as has been described above can reduce an amount of computations required to update map information, as compared with the case where conventional techniques are used.

Embodiment 2

Figure 4:
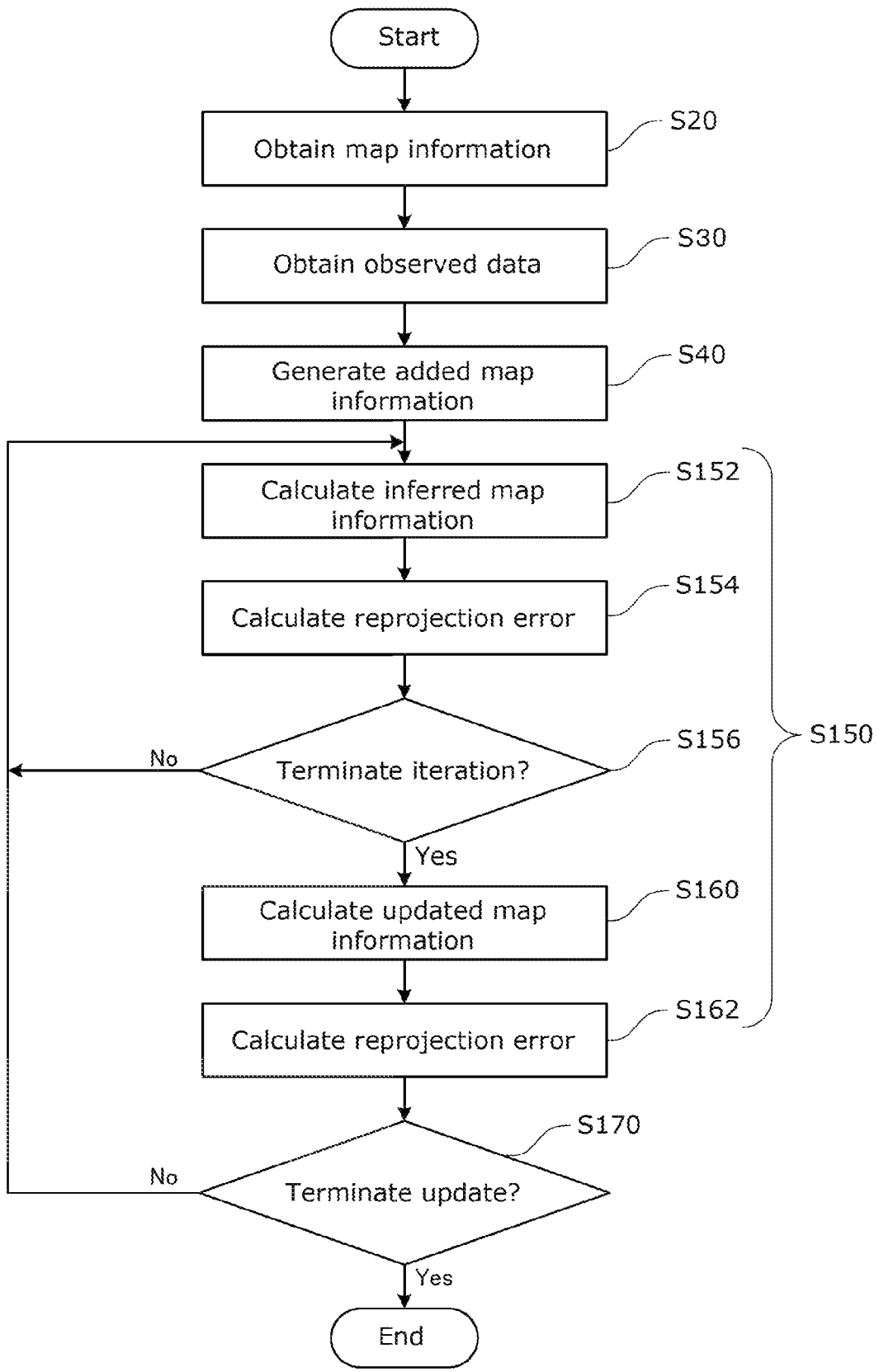
FIG. 4 is a flowchart of a map information update method according to Embodiment 2.

A map information update method according to Embodiment 2 will be described. The map information update method according to the embodiment is mainly different from the map information update method according to Embodiment 1 in that the map information update method according to the embodiment replaces at least part of the step for calculating an amount of corrections to be made on map information using the gradient method by a step for seeking an amount of corrections by inference. Hereinafter, the difference between the map information update method according to the embodiment and the map information update method according to Embodiment 1 will be mainly described with reference to FIG. 4. FIG. 4 is a flowchart of the map information update method according to the embodiment.

As illustrated in FIG. 4, the map information update method according to the embodiment is the same as the map information update method according to Embodiment 1 up to step S40.

Subsequent to step S40, the map information updated in step S40 is updated (S150). Specifically, in the first place, inferred map information is calculated based on the map information updated in step S40, by using a trained neural network inference engine for updates, and the map information updated in step S40 is updated to the inferred map information (S152). The neural network inference engine for updates is to use, as an input, a coefficient group of simultaneous equations that utilize a nonlinear least-squares method for calculating an amount of corrections to be made on the map information updated in step S40, and to learn using a solution to the simultaneous equations as training data. In other words, instead of solving simultaneous equations that utilize the nonlinear least-squares method for calculating an amount of corrections to be made on map information in conventional techniques, the map information update method according to the embodiment uses a coefficient group of simultaneous equations as an input, calculates an amount of corrections to be made on map information by using the neural network inference engine for updates that seeks an amount of corrections to be made on the map information by inference, and calculates inferred map information from the amount of corrections. With this, at least some of computations performed in conventional techniques, such as a solution calculation of simultaneous equations that utilize the nonlinear least-squares method, can be replaced by an inference drawn by the neural network inference engine for updates. For this reason, this embodiment can reduce an amount of calculations and can increase a degree of parallelism of computations, as compared with the gradient method. Therefore, the embodiment can produce advantageous effects such as an increase in the speed of updating map information and a reduction in electric power consumption. Furthermore, inference using the neural network inference engine for updates can reduce computation accuracy. For this reason, it is also possible to simplify a configuration of hardware such as a computer for executing the map information update method.

The neural network inference engine for updates according to the embodiment learns a gradient of an error function indicating a relationship between map information and a reprojection error. Learning performed by the neural network inference engine for updates corresponds to a pattern matching to a localized gradient of the error function. In other words, the neural network inference engine for updates can calculate an amount corresponding to an amount of corrections to be made on map information. Although information such as a position of a camera which is included in map information changes according to map information, an error function learned by the neural network inference engine for updates does not change. Moreover, inferred map information need not agree with map information obtained by solving simultaneous equations that utilize the nonlinear least-squares method.

Note that the following step may be added: a step for preventing inferred map information that is calculated using the neural network inference engine for updates from being far from reaching a solution to map information (i.e., a difference between the inferred map information and the solution to map information is greater than a difference between added map information and the solution to map information). For example, a correction direction for approaching the solution to map information may predicted for added map information, and whether inferred map information is closer to the solution to map information than the added map information is closer the solution to map information may be decided.

Note that although the foregoing has presented an example in which the neural network inference engine for updates is to use a coefficient group of simultaneous equations as an input, and to learn using a solution to simultaneous equations as training data, a learning method is not limited to the above method. For example, the neural network inference engine for updates may use map information as an input, and may use updated map information calculated using the gradient method and the like as training data.

Next, a reprojection error with respect to the map information updated in step S152 by using the neural network inference engine for updates is calculated (S154). Specifically, a reprojection error with respect to the map information updated in step S152 is calculated using the above-described reprojection error function.

Next, whether an iteration termination condition for terminating an iteration of step S152 is satisfied is decided (S156). As the iteration termination condition, the number of updates on map information using the neural network inference engine for updates achieving a predetermined number may be used. Moreover, as the iteration termination condition, convergence of reprojection errors to a predetermined degree may be used.

When it is decided that the iteration termination condition is not satisfied in step S156 (No in S156), the processing reverts to step S152 again.

Alternatively, when it is decided that the iteration termination condition is satisfied in step S156 (Yes in S156), updated map information is calculated based on the map information updated in step S152, by using the gradient method, and the map information updated in step S152 is updated to the updated map information (S160) in the same manner as step S60 according to Embodiment 1.

Next, a reprojection error with respect to the map information updated in step S160 using the gradient method is calculated (S162). Specifically, a reprojection error with respect to the map information is calculated using the above-described reprojection error function.

Next, convergence of updates on the map information is decided based on a reprojection error calculated using the reprojection error function for the map information updated in step S160, and whether to revert to the updating step (S150) or to terminate an update on the map information updated in step S160 is determined based on a result of the decision (S170). For example, in step S170, whether amount of change ΔE of a reprojection error from a previous decision (for the first-time decision, an amount of change from a reprojection error with respect to the predicted map information) is less than predetermined convergence threshold Sc is decided. When amount of change ΔE is less than predetermined convergence threshold Sc (Yes in S170), it is determined that a solution to map information is achieved, and an update on the map information is terminated. Alternatively, when amount of change ΔE is greater than or equal to convergence threshold Sc (No in S170), the processing reverts to the updating step S150, and the map information is updated again.

The map information update method as has been described above can reduce an amount of computations required to update map information, as compared with the case where conventional techniques are used.

Note that the map information update methods according to the embodiment and Embodiment 1 may be combined. For example, instead of steps S60 and S70 according to Embodiment 1, the updating step S150 according to the embodiment may be used. In other words, after step S50 in the map information update method according to Embodiment 1 is performed, inferred map information may be calculated based on the map information updated in step S50, by using a trained neural network inference engine for updates, and the map information updated in step S50 may be updated to the inferred map information. With this, an amount of computations to be performed in the map information update method can be further reduced.

Embodiment 3

Figure 5:
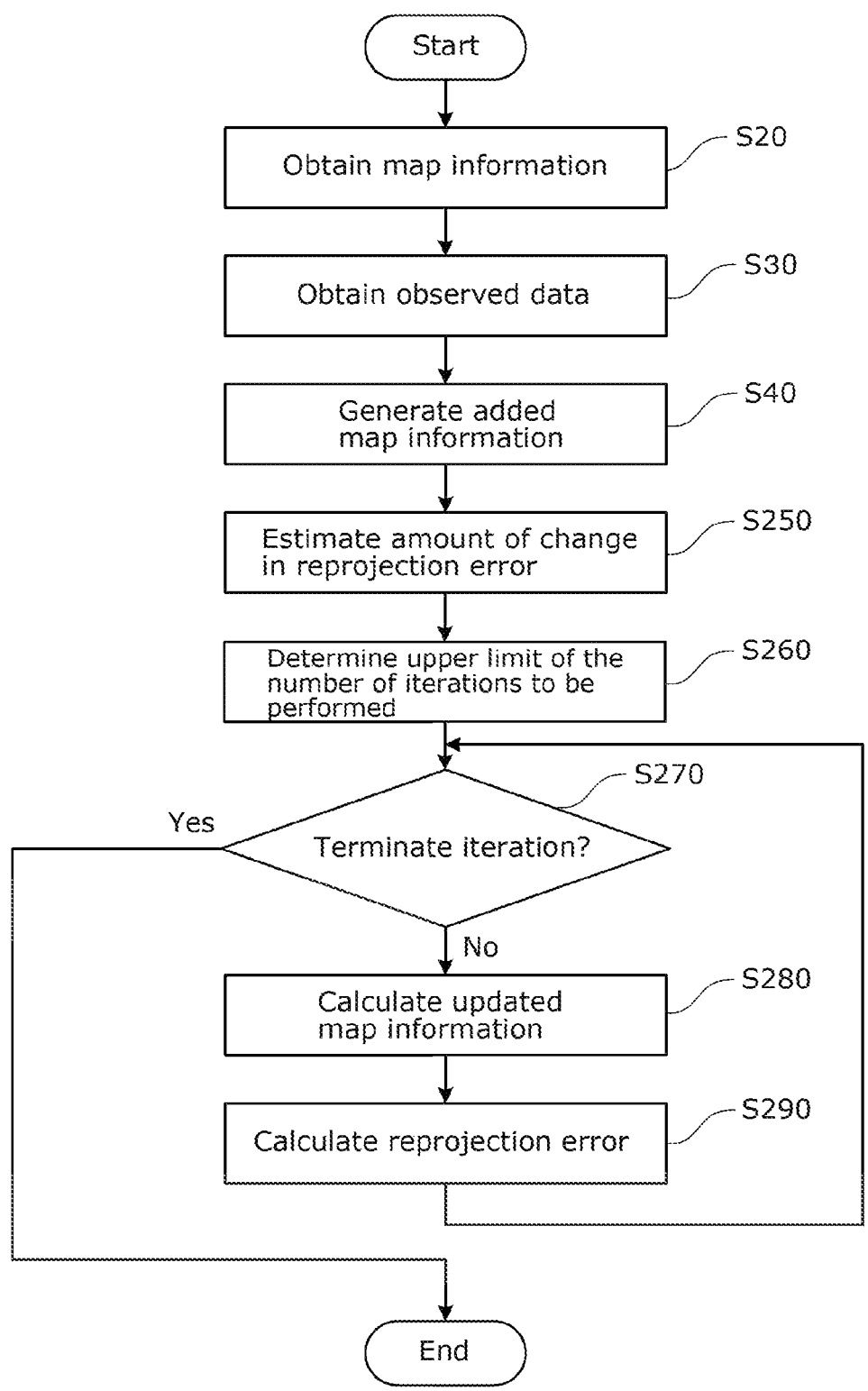
FIG. 5 is a flowchart of a map information update method according to Embodiment 3.

A map information update method according to Embodiment 3 will be described. The map information update method according to the embodiment determines, based on an amount of change in a reprojection error due to bundle adjustment, the upper limit of the number of iterations that map information is to be updated. Hereinafter, a difference between the map information update method according to the embodiment and the map information update method according to Embodiment 1 will be mainly described with reference to FIG. 5. FIG. 5 is a flowchart of the map information update method according to the embodiment.

As illustrated in FIG. 5, the map information update method according to the embodiment is the same as the map information update method according to Embodiment 1 up to step S40.

Subsequent to step S40, an amount of change in a reprojection error due to bundle adjustment performed on the map information updated in step S40 is estimated (S250). The amount of change in a reprojection error due to bundle adjustment performed on the map information is an amount of change obtained by comparing, when bundle adjustment is performed on the map information, a reprojection error with respect to the map information on which bundle adjustment is not yet to be performed with a reprojection error with respect to the map information on which bundle adjustment is performed. In this embodiment, this amount of change is obtained by estimation. Specifically, an amount of change is calculated by using a trained neural network inference engine. The neural network inference engine is to use map information for learning as an input, and to learn using, as training data, a difference between a reprojection error with respect to the map information for learning and a reprojection error with respect to adjusted map information obtained by performing bundle adjustment on the map information for learning. Note that the training data may be calculated from differences between elements included in the map information for learning and elements included in the adjusted map information.

An amount of change in a reprojection error which is estimated as has been described above corresponds to the number of iterations that map information update processing needs to be performed until a solution to map information is obtained. In other words, the number of iterations that map information update processing needs to be performed until a solution to map information is obtained is reduced as an amount of change in a reprojection error is reduced.

Subsequent to step S250, the upper limit of the number of iterations that map information updating step S280 is to be performed, which will be described later, is determined based on the amount of change in a reprojection error estimated in step S250 (S260). As described above, an amount of change in a reprojection error corresponds to the number of iterations that map information updating process needs to be performed until a solution to map information is obtained. For this reason, a determination of the upper limit of the number of iterations that the updating step S280 is to be performed based on an amount of change in a reprojection error can prevent the updating step S280 from being performed more than necessary, while ensuring performance of the updating step S280 for the number of times necessary for obtaining a solution to map information. As has been described above, the embodiment can reduce an amount of computations required to iterate the updating step S280.

The upper limit of the number of iterations which is determined here is appropriately determined according to an amount of change in a reprojection error. Specifically, in step S260, the upper limit of the number of iterations is reduced as an amount of change in a reprojection error is reduced. Moreover, in step S260, when an amount of change in a reprojection error is less than a predetermined threshold, the upper limit of the number of iterations may be set to zero. In the case where the position of a camera, etc. are comparatively accurately estimated at a time at which information on a captured image is actually added to map information, it is not seldom that a reprojection error is already minimized without updating the map information. Therefore, a determination of the upper limit of the number of iterations as has been described above can reduce an amount of computations required to update map information.

Next, whether to terminate an iteration of the map information updating step S280, which will be described later, is decided (S270). In this embodiment, the iteration is terminated when the number of iterations performed exceeds the upper limit of the number of iterations determined in step S260, or when it is decided that reprojection errors to be calculated in the updating step S280, which will be described later, have converged. As a convergence decision method for deciding the convergence of reprojection errors, the following method may be used, for example: a method that decides the convergence by deciding whether an amount of change in a reprojection error is less than or equal to a predetermined threshold before and after the updating step S280.

When it is decided that the iteration is to be terminated in step S270 (Yes in S270), an update on the map information is terminated. Alternatively, when it is decided that the iteration is to be continued in step S270 (No in S270), updated map information is calculated based on the map information updated in step S40, by using the gradient method, and the map information updated in step S40 is updated to the updated map information (S280) in the same manner as step S60 according to Embodiment 1.

Next, a reprojection error with respect to the map information updated using the gradient method is calculated (S290). Specifically, a reprojection error with respect to the map information is calculated using the above-described reprojection error function.

Next, the processing reverts to step S270, and whether to terminate an iteration of the map information updating step S280 is decided. From this step onward, the same processes are to be iterated until termination of an iteration is decided in step S270. In other words, until termination of the iteration is decided in step S270, calculation of updated map information based on the map information updated in the preceding step S280 by using the gradient method and updating of the map information updated in the preceding step S280 to the updated map information are iterated.

The map information update method as has been described above can reduce an amount of computations required to iterate the updating step S280.

Embodiment 4

A landmark generation method according to Embodiment 4 will be described. The landmark generation method according to the embodiment is a method that can be employed in the map information update methods according to the above-described embodiments.

Figure 6:
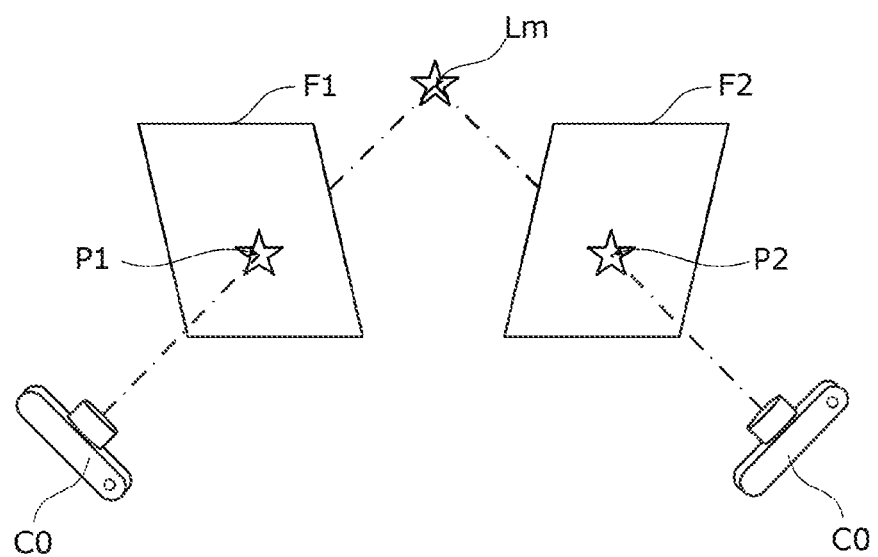
FIG. 6 is a schematic diagram illustrating a landmark generation method.

In VSLAM technology, a landmark is generated based on captured images captured by a camera. Hereinafter, the landmark generation method will be described with reference to FIG. 6. FIG. 6 is a schematic diagram illustrating the landmark generation method.

As illustrated in FIG. 6, landmark Lm is generated by performing triangulation based on first captured image F1 and second captured image F2 captured by camera C0 in the landmark generation method. Specifically, first feature point P1 included in first captured image F1, and second feature point P2 included in second captured image F2 which corresponds with first feature point P1 are extracted. Here, the orientation of camera C0 when second captured image F2 is captured is different from the orientation of camera C0 when first captured image F1 is captured. Moreover, second feature point P2 that corresponds with first feature point P1 indicates capturing of a point on a subject that is the same as the subject on which a point indicated by first feature point P1 is captured. An assumption that first feature point P1 included in first captured image F1 and second feature point P2 included in second captured image F2 indicate a point on the same subject is called matching. Based on the position of first feature point P1 in first captured image F1 and the position of second feature point P2 in second captured image F2 which have been matched as described above and orientations of a camera at a time at which these captured images are captured, the position of a point indicated by first feature point P1 and second feature point P2 on a subject in the first coordinate system can be measured. The point on the subject whose position in the first coordinate system is identified as described above is called landmark Lm.

If first feature point P1 and second feature point P2 accurately match and accurate orientations of a camera at a time at which first captured image F1 and second captured image F2 are captured are obtained, landmark Lm can be accurately generated. However, when two feature points that do not correspond with each other are matched, an inaccurate landmark is generated. Landmarks inaccurately generated as described above are noise in map information. Landmarks inaccurately generated as described above are the so-called point cloud noise. A large number of factors create such point cloud noise. For example, inclusion of many repetitive patterns in a captured image may become a factor in creating point cloud noise.

For map information including a landmark group that creates point cloud noise, a reprojection error may not be reduced. However, the landmark generation method according to the embodiment is a landmark generation method that can reduce such point cloud noise.

Figure 7:
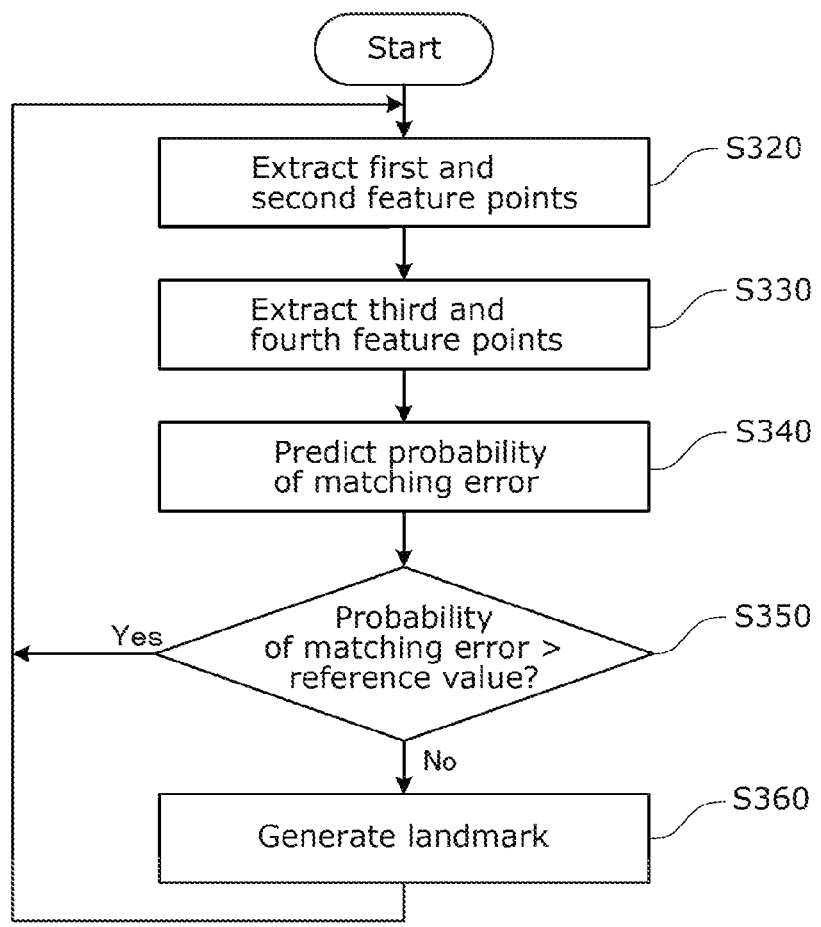
FIG. 7 is a flowchart of a landmark generation method according to Embodiment 4.

Hereinafter, the landmark generation method according to the embodiment will be described with reference to FIG. 7. FIG. 7 is a flowchart of the landmark generation method according to the embodiment.

The landmark generation method according to the embodiment is a method for generating landmark Lm by performing triangulation based on first captured image F1 and second captured image F2 captured by a camera.

Firstly, as illustrated in FIG. 7, first feature point P1 included in first captured image F1, and second feature point P2 included in second captured image F2 which is a matching target to be matched with first feature point P1 are extracted (S320) in the landmark generation method according to the embodiment. Here, second feature point P2 that is a matching target to be matched with first feature point P1 is a point in second captured image F2 which is objectively determined to be indicating, using an image process technique, a point on a subject that is the same as the subject on which first feature point P1 is indicated, for example.

Figure 8:
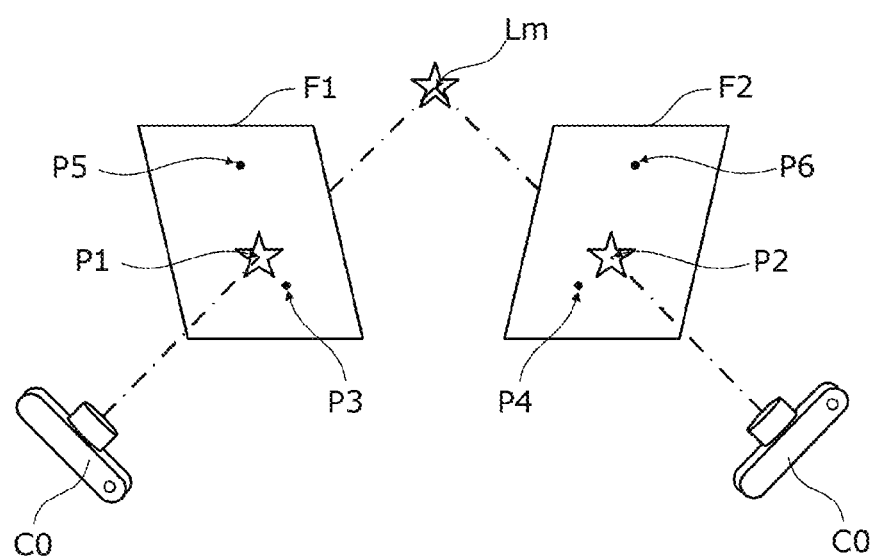
FIG. 8 is a schematic diagram illustrating a third feature point and a fourth feature point according to Embodiment 4.

Next, a third feature point included in first captured image F1 which is at a short distance from first feature point P1, and a fourth feature point included in second captured image F2 which is a matching target to be matched with the third feature point are extracted (S330). Here, the third feature point and the fourth feature point will be described with reference to FIG. 8. FIG. 8 is a schematic diagram illustrating third feature point P3 and fourth feature point P4 according to the embodiment. In the example shown in FIG. 8, third feature point P3 and fifth feature point P5 can be extracted other than first feature point P1 in first captured image F1 that is captured by camera C0. In addition, fourth feature point P4 and sixth feature point P6 can be extracted other than second feature point P2 in second captured image F2 that is captured by camera C0. Here, fourth feature point P4 is a matching target to be matched with third feature point P3, and sixth feature point P6 is a matching target to be matched with fifth feature point P5. In this embodiment, third feature point P3 included in first captured image F1 which is at a short distance from first feature point P1, and a fourth feature point included in second captured image F2 which is a matching target to be matched with third feature point P3 are extracted. Note that a short distance from first feature point P1 may be defined as a distance from first feature point P1 that is (i) less than or equal to half the maximum dimension of first captured image F1, (ii) less than or equal to a third of the maximum dimension of first captured image F1, (iii) less than or equal to a fifth of the maximum dimension of first captured image F1, and (iv) less than or equal to a tenth of the maximum dimension of first captured image F1, for example.

Next, as illustrated in FIG. 7, a probability of a matching error in matching first feature point P1 with second feature point P2 is predicted based on information on first feature point P1, second feature point P2, third feature point P3, and fourth feature point P4 (S340). A probability of an error as described above can be calculated using a trained neural network inference engine, for example.

A learning method used here for a neural network inference engine will be described. For example, from a first captured image for learning and a second captured image for learning, a first feature point for leaning included in the first captured image for leaning and a second feature point for learning included in the second captured image for learning which is a matching target to be matched with the first feature point for learning are extracted. Moreover, a third feature point for learning included in the first captured image for learning which is at a short distance from the first feature point for learning and a fourth feature point for learning included in the second captured image for learning which is a matching target to be matched with the third feature point for learning are extracted. Next, a neural network inference engine uses, as an input, information on the first feature point for learning, the second feature point for learning, the third feature point for learning, and the fourth feature point for learning, and learns using, as training data, a result of a decision whether a landmark generated based on the first feature point for learning and the second feature point for learning is noise. Here, whether the landmark is noise can be decided based on information different from information on the captured images, for example. For example, the use of, for example, a captured image in which a subject the same as a subject captured in captured images is captured using light detection and ranging (LIDAR) can decide whether the landmark is noise.

By performing the above-described learning on various captured images, a neural network inference engine that can predict a probability of a matching error can be realized. Here, a reason for the use of third feature point P3 that is at a short distance from first feature point P1 for prediction of a probability of an error will be provided. For example, as described above, inclusion of many repetitive patterns in a captured image may become a factor in an occurrence of a matching error. When many repetitive patterns are included in a captured image, it is thought that a feature point positioned in the vicinity of a first feature point includes information pertaining to a matching error. For this reason, information on third feature point P3 and fourth feature point P4 is used for prediction of a probability of a matching error in this embodiment.

Next, as illustrated in FIG. 7, whether to generate a landmark based on first feature point P1 and second feature point P2 is decided based on the probability of the error (S350). Specifically, when the probability of the error predicted in step S340 is greater than a reference value (Yes in S350), it is decided that a probability that a landmark becomes noise is high, and the processing reverts to step S320. Alternatively, when the probability of the error predicted in step S340 is less than or equal to the reference value (No in S350), it is decided that a probability that the landmark becomes noise is low, and a landmark is generated based on first feature point P1 and second feature point P2 (S360).

From this step onward, the same processes are repeated for all pairs of feature points of interest.

As has been described above, since a landmark is not generated when a probability of a matching error in matching first feature point P1 with second feature point P2 is high, the landmark generation method according to the embodiment can reduce landmarks that become noise. Therefore, accurate map information can be generated.

Note that, although a landmark is not generated when a probability of a matching error is high in the above-described landmark generation method, the landmark generation method according to the embodiment is not limited to the above-described method. For example, a landmark may be generated even when a probability of a matching error is high, and information on a likelihood may be given to the landmark according to the probability of the matching error. Landmarks each having information on a likelihood allows a decision of whether each landmark is noise to be made also in reference to likelihoods of other landmarks. With this, it is possible to more accurately decide whether a landmark is noise.

Embodiment 5

A feature point distribution adjustment method according to Embodiment 5 will be described. The feature point distribution adjustment method according to the embodiment is a method for adjusting a distribution of feature points corresponding to one or more landmarks included in a captured image captured by a camera, and can be used in the above-described embodiments.

Figure 9:
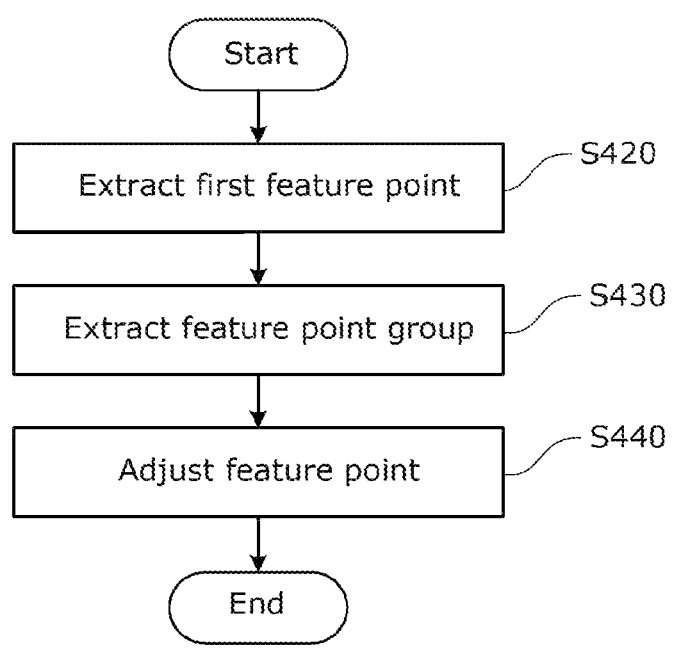
FIG. 9 is a flowchart of a feature point distribution adjustment method according to Embodiment 5.

Feature points extracted from a captured image are not necessarily equally distributed in the captured image since the feature points are determined according to the shape, pattern, etc. of a subject. For example, since excessively concentrated feature points in a captured image include redundant information, computations on feature points need to be performed more than necessary. Moreover, since storage capacity is also unnecessarily occupied, other important information items may be prevented from being stored. Presence of many similar feature points may lead to a cause of a matching error. Moreover, insufficiency of feature points in an area of interest leads to difficulty in obtaining information on the area of interest. The feature point distribution adjustment method according to the embodiment is a method capable of equally distributing feature points. Hereinafter, the feature point distribution adjustment method according to the embodiment will be described with reference to FIG. 9. FIG. 9 is a flowchart of the feature point distribution adjustment method according to the embodiment.

Figure 10:
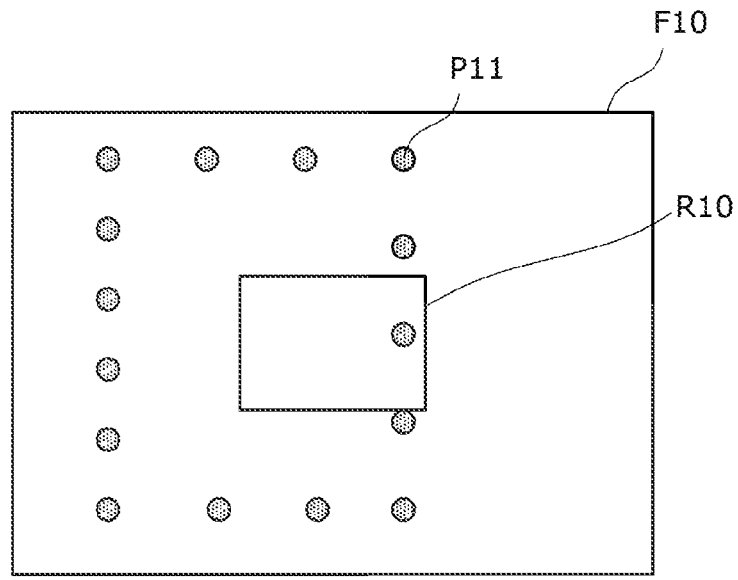
FIG. 10 is a schematic diagram illustrating Example 1 of a plurality of first feature points according to Embodiment 5.
Figure 11:
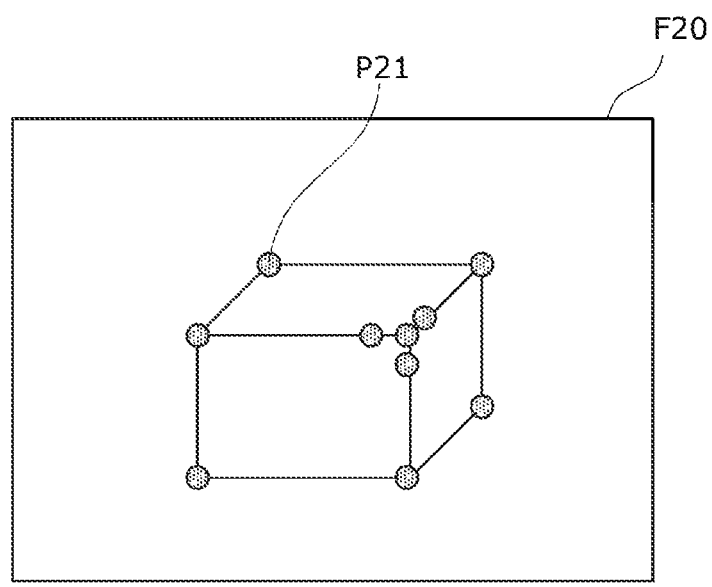
FIG. 11 is a schematic diagram illustrating Example 2 of a plurality of first feature points according to Embodiment 5.

Firstly, as illustrated in FIG. 9, a plurality of first feature points corresponding to one or more landmarks included in a captured image are extracted (S420). Here, the plurality of first feature points will be described with reference to FIG. 10 and FIG. 11. FIG. 10 and FIG. 11 are schematic diagrams illustrating Example 1 and Example 2 of the plurality of first feature points according to the embodiment, respectively.

Example 1 shown in FIG. 10 illustrates a plurality of first feature points P11 included in captured image F10. FIG. 10 also illustrates area of interest R10 in captured image F10.

Example 2 shown in FIG. 11 illustrates a plurality of first feature points P21 included in captured image F20. FIG. 11 illustrates an image of a subject having a parallelepiped shape in captured image F20.

Figure 12:
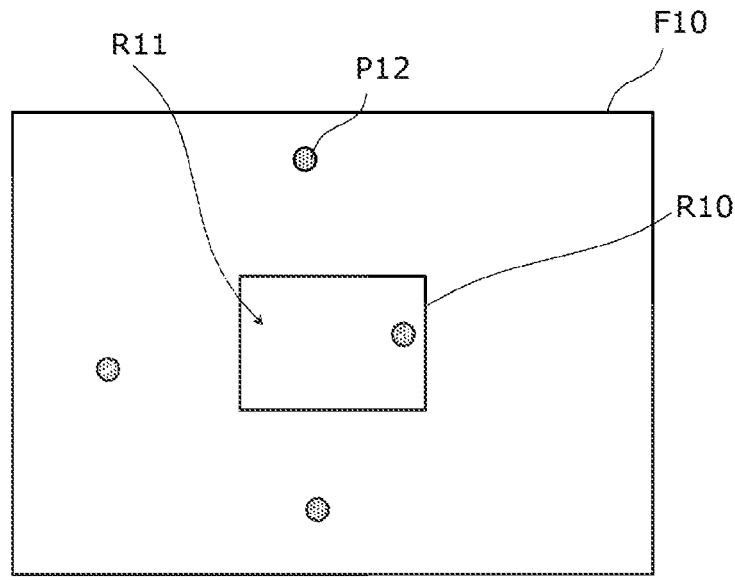
FIG. 12 is a schematic diagram illustrating Example 1 of a feature point group including a plurality of second feature points according to Embodiment 5.
Figure 13:
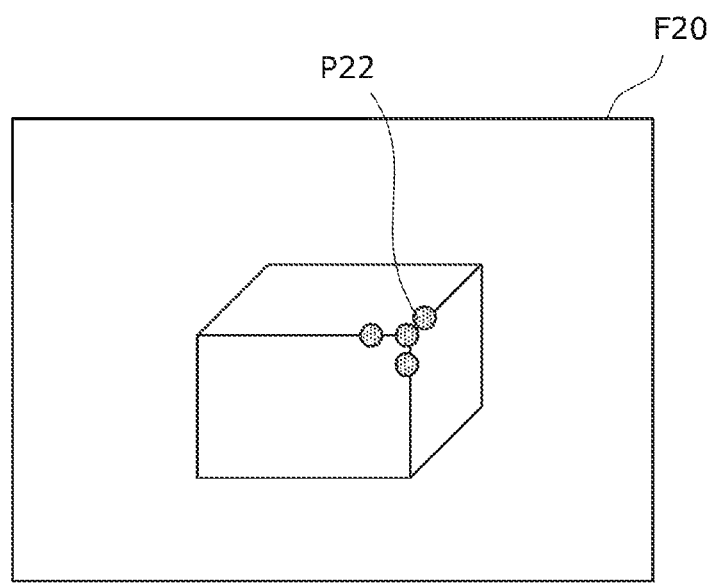
FIG. 13 is a schematic diagram illustrating Example 2 of a feature point group including a plurality of second feature points according to Embodiment 5.

Next, as illustrated in FIG. 9, a feature point group consisting of a plurality of second feature points is extracted from among the plurality of first feature points (S430). Here, the feature point group consisting of a plurality of second feature points will be described with reference to FIG. 12 and FIG. 13. FIG. 12 and FIG. 13 are schematic diagrams illustrating Example 1 and Example 2 of a feature point group consisting of a plurality of second feature points according to the embodiment, respectively.

Example 1 shown in FIG. 12 illustrates a feature point group consisting of four second feature points P12 that are extracted from among the plurality of first feature points P11 included in captured image F10 in FIG. 10. The four second feature points P12 as described above are extracted based on a condition that an intersection point at which a line segment connecting two second feature points P12 among the four extracted second feature points P12 and a line segment connecting the other two second feature points P12 intersect is a point in insufficient area R11 in which a first feature point is insufficient within an area of interest.

Example 2 shown in FIG. 13 illustrates four second feature points P22 that are extracted from among the plurality of first feature points P21 included in captured image F20 illustrated in FIG. 11. FIG. 13 illustrates four second feature points P22 that are concentrated and provided in the vicinity of edges of a parallelepiped in captured image F20. Moreover, in extraction of the second feature points, not only positions of the second feature points are taken into account, but also the similarity in feature quantities of feature points may be taken into account. In other words, first feature points which also have similar feature quantities may be extracted as second feature points.

A feature point group as described above can be readily extracted by identifying, for example, the following in advance: an image block including an area of interest included in a captured image, an image block in the vicinity of the foregoing image block, a position of interest, etc. A feature point group can be extracted using a trained neural network inference engine, for example. For example, four second feature points P12 illustrated in FIG. 12 can be extracted using a trained neural network inference engine. For example, in training the neural network inference engine, a plurality of first feature points are used as inputs. Moreover, the neural network inference engine trained using, as training data, four second feature points that satisfy a condition realizes a neural network inference engine that extracts second feature points. The foregoing condition is specifically a condition that an intersection point at which a line segment connecting two second feature points among four extracted second feature points and a line segment connecting the other two second feature points intersect is a point in an insufficient area, in which first feature points are insufficient, within an area of interest. In addition, the four second feature points may be extracted such that the intersection point is closest to the barycenter of the area of interest.

Note that whether feature points are on a surface of the same object can be decided based on, for example, information on estimated positions of landmarks corresponding to the feature points in a first coordinate system.

Figure 14:
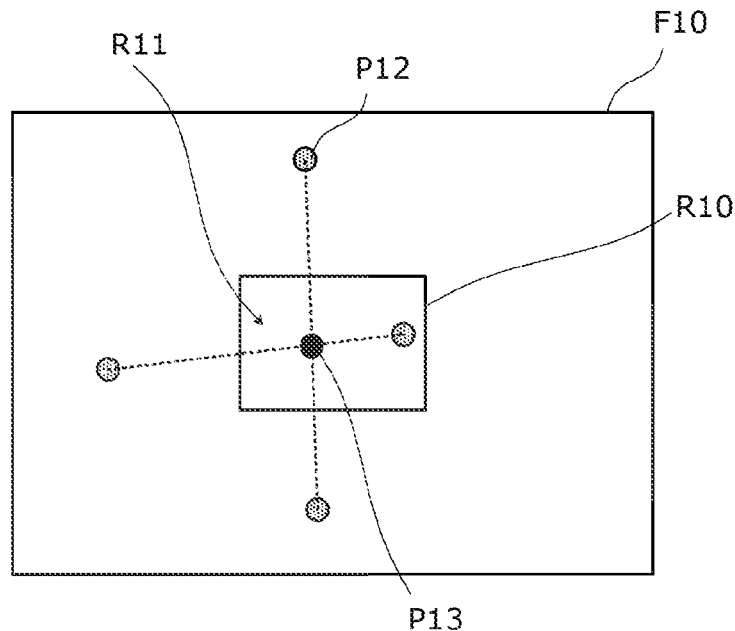
FIG. 14 is a schematic diagram illustrating an example of adding a third feature point according to Embodiment 5.
Figure 15:
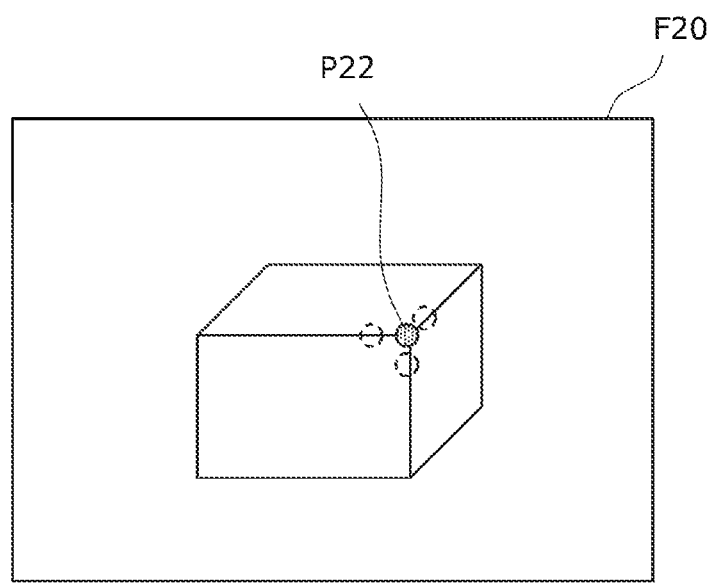
FIG. 15 is a schematic diagram illustrating an example of deleting second feature points according to Embodiment 5.

Next, as illustrated in FIG. 9, at least one of the following is performed based on a distribution of the plurality of second feature points in the captured image: (i) a deletion of one or more second feature points included in the feature point group (i.e., a plurality of second feature points), and (ii) an addition of a third feature point based on the plurality of second feature points (S440). Here, an example of a process to be performed in the step will be described with reference to FIG. 14 and FIG. 15. FIG. 14 is a schematic diagram illustrating an example of adding third feature point P13 according to the embodiment. FIG. 15 is a schematic diagram illustrating an example of deleting second feature points P22 according to the embodiment.

In the example shown in FIG. 14, third feature point P13 is added based on the four second feature points P12, since a feature point insufficient area is present in the left part of area of interest R10. In the example shown in FIG. 14, third feature point P13 is added at an intersection point at which a line segment connecting two second feature points P12 among the four second feature points P12 and a line segment connecting the other two second feature points P12 intersect. The feature quantity of third feature point P13 may be determined based on feature quantities of the four second feature points P12. For example, the feature quantity of third feature point P13 may be an average of the feature quantities of the four second feature points P12, or may be a weighted average with consideration given to distances between third feature point P13 and the four second feature points P12.

The feature point insufficient area may be identified based on distribution density of second feature points P12 in area of interest R10 that has been determined in captured image F10, for example. Moreover, a region where a distance up to the closest second feature point P12 among points within area of interest R10 is greater than a predetermined reference value may be identified as a feature point insufficient area.

In addition, in the example shown in FIG. 15, three points among the four second feature points P22 that are concentrated and provided as illustrated in FIG. 13 are deleted. In FIG. 15, the deleted three second feature points are denoted by dashed lines. As described above, unnecessary second feature points can be deleted. Note that extraction of second feature points using the same method can maintain a match between remained second feature points in different captured images. Note that a remained second feature point is also called a representative feature point. A second feature point provided at a position closest to the barycenter of an area in which a plurality of second feature points are provided may be determined to be a representative feature point, for example. Moreover, a new representative feature point may be generated at the barycenter position, and all of the plurality of second feature points may be deleted. In this case, a feature quantity of the representative feature point may be a weighted average of feature quantities of the plurality of second feature points according to distances of the plurality of second feature points from the barycenter.

As has been described above, the feature point distribution adjustment method according to the embodiment can appropriately adjust a distribution of feature points included in a captured image. With this, some of problems arising from a distribution state of feature points as described above can be solved.

Note that the feature point distribution adjustment method according to the embodiment is not limited to the above-described method. For example, if information pertaining to a likelihood of an extracted feature point group can be obtained, processing details may be changed according to the likelihood. For example, when the likelihood is low, a third feature point based on the feature point group need not be added. Moreover, a likelihood of a feature point group may be determined to be a likelihood of a third feature point that is added based on the feature point group.

[Hardware Configuration]

Figure 16:
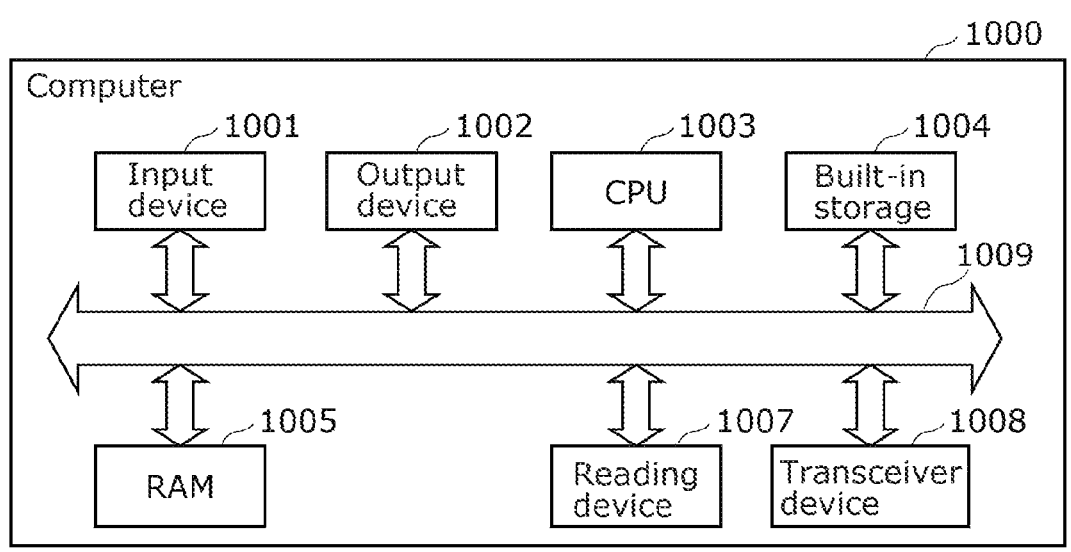
FIG. 16 is a diagram illustrating one example of a hardware configuration of a computer for executing, using software, a method according to each embodiment.

A hardware configuration for executing the methods according to the above-described embodiments will be described with reference to FIG. 16. FIG. 16 is a diagram illustrating one example of a hardware configuration of computer 1000 for executing, using software, a method according to each embodiment. In other words, computer 1000 can realize (i) a map information update device that executes the map information update methods according to Embodiments 1 through 3, (ii) a landmark generation device that executes the landmark generation method according to Embodiment 4, and (iii) a feature point distribution adjustment device that executes the feature point distribution adjustment method according to Embodiment 5.

Computer 1000 includes, as illustrated in FIG. 16, input device 1001, output device 1002, CPU 1003, built-in storage 1004, RAM 1005, reading device 1007, transceiver device 1008, and bus 1009. Bus 1009 connects input device 1001, output device 1002, CPU 1003, built-in storage 1004, RAM 1005, reading device 1007, and transceiver device 1008.

Input device 1001 is a user interface device, such as a keyboard, a mouse, an input button, a touch pad, or a touch panel display, and receives a user operation. Note that input device 1001 may have a configuration capable of receiving voice control and remote control using a remote controller, other than receiving a user contact operation.

Output device 1002 is a device that outputs a signal from computer 1000. Output device 1002 may be a user interface device such as a display and a loudspeaker, other than a signal output terminal.

Built-in storage 1004 is, for example, flash memory. Moreover, built-in storage 1004 may store, in advance, programs and the like for executing the methods according to Embodiments 1 through 5.

RAM 1005 is random access memory, and is used for storing, for example, data that is calculated when a program or an application is executed.

Reading device 1007 reads information from a recording medium such as universal serial bus (USB) memory. Reading device 1007 reads a program or an application as described above from a recording medium in which the program or the application is stored, and stores the program or the application in built-in storage 1004.

Transceiver device 1008 is a communication circuit for performing wireless or wired communication. Transceiver device 1008 communicates with a server device connected to a network to download a program or an application as described above from the server device, and stores the program or the application in built-in storage 1004, for example.

CPU 1003 is a central processing unit. CPU 1003 copies a program, an application, or the like stored in built-in storage 1004 to RAM 1005, sequentially reads commands included in the copied program, the copied application, or the like from RAM 1005 for execution.

Variation, Etc.

Hereinbefore, the methods according to the present disclosure have been described based on the embodiments, but the present disclosure is not limited to these embodiments. Embodiments arrived at by a person of skill in the art making various modifications to the embodiments, and different embodiments realized by optionally combining some of structural elements in the embodiments are included in the scope of the present disclosure as long as these embodiments do not depart from the essence of the present disclosure.

The following embodiments may be included within the scope of one or more aspects of the present disclosure.

Each method according to the present disclosure may be a computer program realized by a computer, and may be a digital signal of the computer program. Furthermore, the present disclosure may be realized as a non-transitory computer-readable recording medium such as a CD-ROM which stores the computer program.

Moreover, the present disclosure may be a computer system that includes a microprocessor and memory. The memory stores the above computer program, and the microprocessor may operate according to the above computer program.

In addition, transmission of the recording medium on which the program or the digital signal are recorded, or transmission of the program or the digital signal via the network may allow another independent computer system to execute the program or the digital signal.

The above embodiments may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in VSLAM technology and the like, for example.

The invention claimed is:

1. A map information update method comprising:
   (a) obtaining map information including estimated positions of a camera and one or more landmarks in a first coordinate system;
   (b) obtaining landmark observed positions in a second coordinate system in a captured image captured by the camera, the landmark observed positions indicating positions of the one or more landmarks;
   (c) adding that includes (i) generating added map information by adding information pertaining to the landmark observed positions to the map information obtained in (a), and (ii) updating the map information obtained in (a) to the added map information;
   (d) predicting that includes (i) calculating predicted map information based on the map information updated in (c), by using a neural network inference engine that has been trained, and (ii) updating the map information updated in (c) to the predicted map information; and
   (e) updating information that includes (i) calculating updated map information based on the map information updated in (d), by using a gradient method, and (ii) updating the map information updated in (d) to the updated map information.

2. The map information update method according to claim 1, further comprising:
   (f) deciding that includes (i) deciding convergence of updates on the map information updated in (e), based on a reprojection error calculated using a reprojection error function for the map information updated in (e), and (ii) determining, based on a result of the deciding the convergence, whether to revert to (d) or (e) or to terminate an update on the map information updated in (e), wherein
   the reprojection error function is a function for calculating an error between the landmark observed positions and reprojection positions in the captured image, the reprojection positions corresponding to the landmark observed positions and being calculated based on the map information.

3. The map information update method according to claim 1, wherein
   the neural network inference engine is to use map information for learning as an input, and to learn using updated map information for learning as training data,
   the updated map information for learning is generated based on the map information for learning, and reduces a reprojection error calculated using a reprojection error function, and
   the reprojection error function is a function for calculating an error between the landmark observed positions and reprojection positions in the captured image, the reprojection positions corresponding to the landmark observed positions and being calculated based on the map information.

4. The map information update method according to claim 2, wherein
the neural network inference engine is to use map information for learning as an input, and to learn using updated map information for learning as training data,
the updated map information for learning is generated based on the map information for learning, and reduces a reprojection error calculated using a reprojection error function, and
the reprojection error function is a function for calculating an error between the landmark observed positions and reprojection positions in the captured image, the reprojection positions corresponding to the landmark observed positions and being calculated based on the map information.

5. The map information update method according to claim 1, wherein
(e) further includes (i) calculating inferred map information based on the map information updated in (d), by using a neural network inference engine for updates that has been trained, and (ii) updating the map information updated in (d) to the inferred map information.

6. The map information update method according to claim 5, wherein
the neural network inference engine for updates is to use, as an input, a coefficient group of simultaneous equations that utilize a nonlinear least-squares method for calculating an amount of corrections to be made on the map information updated in (c), and to learn using a solution to the simultaneous equations as training data.

7. The map information update method according to claim 2, wherein
the reprojection error includes a total sum of one of or both of: (i) errors calculated for a plurality of landmarks included in the one or more landmarks by using the reprojection error function; and (ii) errors calculated for a plurality of captured images by using the reprojection error function, the plurality of captured images each being the captured image.

8. A map information update method comprising:
(a) obtaining map information including estimated positions of a camera and one or more landmarks in a first coordinate system;
(b) obtaining landmark observed positions in a second coordinate system in a captured image captured by the camera, the landmark observed positions indicating positions of the one or more landmarks;
(c) adding that includes (i) generating added map information by adding information pertaining to the landmark observed positions to the map information obtained in (a), and (ii) updating the map information obtained in (a) to the added map information; and
(d) updating that includes:
(d-1) inferring including (i) calculating inferred map information based on the map information updated in (c), by using a neural network inference engine for updates that has been trained, and (ii) updating the map information updated in (c) to the inferred map information; and
(d-2) updating including (i) calculating updated map information based on the map information updated in (d-1), by using a gradient method, and (ii) updating the map information updated in (d-1) to the updated map information.

9. The map information update method according to claim 8, further comprising:
(e) deciding that includes (i) deciding convergence of updates on the map information updated in (d), based on a reprojection error calculated using a reprojection error function for the map information updated in (d), and (ii) determining, based on a result of the deciding the convergence, whether to revert to (d) or to terminate an update on the map information updated in (d), wherein
the reprojection error function is a function for calculating an error between the landmark observed positions and reprojection positions in the captured image, the reprojection positions corresponding to the landmark observed positions and being calculated based on the map information.

10. The map information update method according to claim 8, wherein
the neural network inference engine for updates is to use, as an input, a coefficient group of simultaneous equations that utilize a nonlinear least-squares method for calculating an amount of corrections to be made on the map information updated in (c), and to learn using a solution to the simultaneous equations as training data.

11. The map information update method according to claim 8, wherein
(d) further includes deciding whether an iteration termination condition for (d-1) is satisfied.

12. The map information update method according to claim 9, wherein
the reprojection error includes a total sum of one of or both of: (i) errors calculated for a plurality of landmarks included in the one or more landmarks by using the reprojection error function; and (ii) errors calculated for a plurality of captured images by using the reprojection error function, the plurality of captured images each being the captured image.

* * * * *